US008270338B2

(12) United States Patent
Chandra et al.

(10) Patent No.: US 8,270,338 B2
(45) Date of Patent: *Sep. 18, 2012

(54) OPPORTUNISTIC USE OF WIRELESS NETWORK STATIONS AS REPEATERS

(75) Inventors: Ranveer Chandra, Kirkland, WA (US); Paramvir Bahl, Bellevue, WA (US); Jitendra D. Padhye, Redmond, WA (US); Yan Yu, Beijing (CN)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/245,314

(22) Filed: Sep. 26, 2011

(65) Prior Publication Data

US 2012/0014313 A1    Jan. 19, 2012

Related U.S. Application Data

(60) Division of application No. 11/676,207, filed on Feb. 16, 2007, now Pat. No. 8,050,212, which is a continuation-in-part of application No. 10/428,218, filed on May 2, 2003, now Pat. No. 7,720,045.

(51) Int. Cl.
*H04B 7/14* (2006.01)
*H04B 7/15* (2006.01)
*H04B 7/00* (2006.01)
*H04W 4/00* (2009.01)

(52) U.S. Cl. ....... 370/315; 370/328; 455/11.1; 455/41.2
(58) Field of Classification Search .................. 370/315, 370/328, 338; 455/7, 11.1, 41.1–41.2
See application file for complete search history.

(56) References Cited

U.S. PATENT DOCUMENTS

| 5,664,007 | A | 9/1997 | Samadi et al. |
| 6,026,297 | A | 2/2000 | Haartsen |
| 6,028,853 | A | 2/2000 | Haartsen |
| 6,069,887 | A | 5/2000 | Geiger et al. |
| 6,522,629 | B1 | 2/2003 | Anderson, Sr. |
| 6,546,425 | B1 | 4/2003 | Hanson et al. |
| 6,591,382 | B1 | 7/2003 | Molloy et al. |
| 6,650,648 | B1 | 11/2003 | Du |

(Continued)

OTHER PUBLICATIONS

"Avaya and Meru Networks", retrieved at <<http://www.avaya.com/master-usa/en-us/resource/assets/brochures/lb2666dev.pdf>>, Avaya Inc., 2005, pp. 02.

(Continued)

*Primary Examiner* — George Eng
*Assistant Examiner* — Nam Huynh
(74) *Attorney, Agent, or Firm* — Lee & Hayes, PLLC

(57) ABSTRACT

Implementation of opportunistic use of stations in a wireless network as repeaters is described. In one implementation, a station detects the existence of rate anomaly in a wireless network. In response to the rate anomaly, the station may transform into a software repeater for certain other neighboring stations. The repeater function allows for the relaying of packets sent by these neighboring stations to the access point and vice versa. The other neighboring stations, owing to their relative proximity to the repeater station, transmit data at a higher rate to the repeater station. Thus, the removal of the slower stations reduces clogging of the access point and increases the overall data rate within the wireless network. Further, a zero-overhead network coding protocol may be implemented in conjunction with the repeater function to increase capacity of the wireless network.

12 Claims, 10 Drawing Sheets

U.S. PATENT DOCUMENTS

| | | | |
|---|---|---|---|
| 6,683,866 | B1 | 1/2004 | Stanwood et al. |
| 6,765,955 | B1 | 7/2004 | Davis et al. |
| 6,865,371 | B2 | 3/2005 | Salonidis et al. |
| 6,889,033 | B2 | 5/2005 | Bongfeldt |
| 6,895,247 | B2 | 5/2005 | Mostafa |
| 6,965,773 | B2 | 11/2005 | Basson et al. |
| 7,006,467 | B2 * | 2/2006 | Anton et al. ............ 370/329 |
| 7,020,436 | B2 | 3/2006 | Schmutz |
| 7,043,252 | B2 * | 5/2006 | Khitrik et al. ............ 455/452.2 |
| 7,092,434 | B2 | 8/2006 | Moon et al. |
| 7,126,937 | B2 | 10/2006 | Crosbie et al. |
| 7,386,314 | B2 | 6/2008 | Kim |
| 2002/0105933 | A1 | 8/2002 | Higuchi |
| 2002/0176366 | A1 * | 11/2002 | Ayyagari et al. ............ 370/245 |
| 2002/0187746 | A1 | 12/2002 | Cheng et al. |
| 2006/0046644 | A1 | 3/2006 | Chung et al. |
| 2006/0056352 | A1 | 3/2006 | Proctor, Jr. et al. |
| 2006/0063484 | A1 | 3/2006 | Proctor, Jr. et al. |
| 2007/0147338 | A1 | 6/2007 | Chandra et al. |

OTHER PUBLICATIONS

Sharma, et al., "Implementation Experiences of Bandwidth Guarantee on a Wireless LAN", retrieved at <<http://www.ecsl.cs.sunysb.edu/~chiueh/cse634/wrether.pdf>>, Rether Networks Inc., Centereach, New York, pp. 1-22 , 2002.

Willig, "Polling-based MAC Protocols fo Improving Real-Time Performance in a Wireless PROFIBUS", retrieved at <<http://www.tkn.tu-berlin.de/publications/papers/final_webout.pdf>>, IEEE, 2001, pp. 100-112.

* cited by examiner

OPPORTUNISTIC USE OF WIRELESS NETWORK STATIONS AS REPEATERS

CROSS-REFERENCE TO RELATED APPLICATION

This patent application is a divisional of, and claims priority to, U.S. patent application Ser. No. 11/676,207 filed Feb. 16, 2007, a continuation-in-part of U.S. patent application Ser. No. 10/428,218, filed May 2, 2003, now U.S. Pat. No. 7,720,045, which is hereby incorporated by reference.

BACKGROUND

Wireless networks are increasingly being used to access the Internet by users. However, wireless networks do suffer from performance problems. A majority of the performance problems in wireless local area networks or Wi-Fi networks occur simply because of the position of stations with respect to the access point. These problems include slow data rate, packet loss during transmission, and loss of access in certain areas within the wireless network range.

One of the well-known problems in Wi-Fi networks is the rate anomaly problem. This problem arises when multiple Wi-Fi stations, which are within the interference range of one another, transmit packets at different transmission rates. The primary reason for the occurrence of this problem is because wireless networks employ IEEE 802.11 protocol, which arbitrates channel access requests on a per-packet basis. Thus, assuming all stations transmit packets of equal size, then the stations or stations that use lower transmission rate consume more 'airtime'. This limits the throughput of stations that are capable of transmitting at higher rates leading to severe throughput degradation in some cases.

The rate anomaly problem can arise in many situations. In the most common scenario, a station may transmit packets at a lower transmission rate due to the relatively large distance between the station and the access point. This is because the larger distance causes lowering of the signal quality of the transmission and the built-in auto-rate algorithm in the station reduces the transmission rate of the station to compensate for the lower signal quality. However, as discussed above, the station transmitting packets at lower rate can hurt stations that are closer to the access point and capable of transmitting at higher rate.

Another situation where the rate anomaly manifests itself is in a mixed mode operation context. In an example of the mixed mode operation situation, an IEEE 802.11g capable station may co-exist with older IEEE 802.11b stations. An IEEE 802.11b capable station can achieve the maximum rate of 11 Mbps while the highest date rate of IEEE 802.11g capable station is 54 Mbps. Thus, in the above mixed mode operation situation, the IEEE 802.11g capable station may perform suboptimally.

SUMMARY

Implementation of opportunistic use of stations in a wireless network as repeaters is described. In one implementation, a station detects the existence of rate anomaly in a wireless network. In response to the rate anomaly, the station may transform into a software repeater for certain other neighboring stations. The station achieves the repeater function by relaying the packets sent by these neighboring stations to the access point and vice versa. The other neighboring stations, owing to their relative proximity to the repeater station, transmit data at a higher rate to the repeater station. Thus, the removal of the slower stations reduces clogging of the access point and increases the overall data rate within the wireless network. Further, a zero-overhead network coding protocol may be implemented in conjunction with the repeater function to increase capacity of the wireless network.

BRIEF DESCRIPTION OF THE CONTENTS

The detailed description is described with reference to the accompanying figures. In the figures, the left-most digit of a reference number identifies the figure in which the reference number first appears. The use of the same reference numbers in different figures indicates similar or identical items.

DETAILED DESCRIPTION

Figure 1:
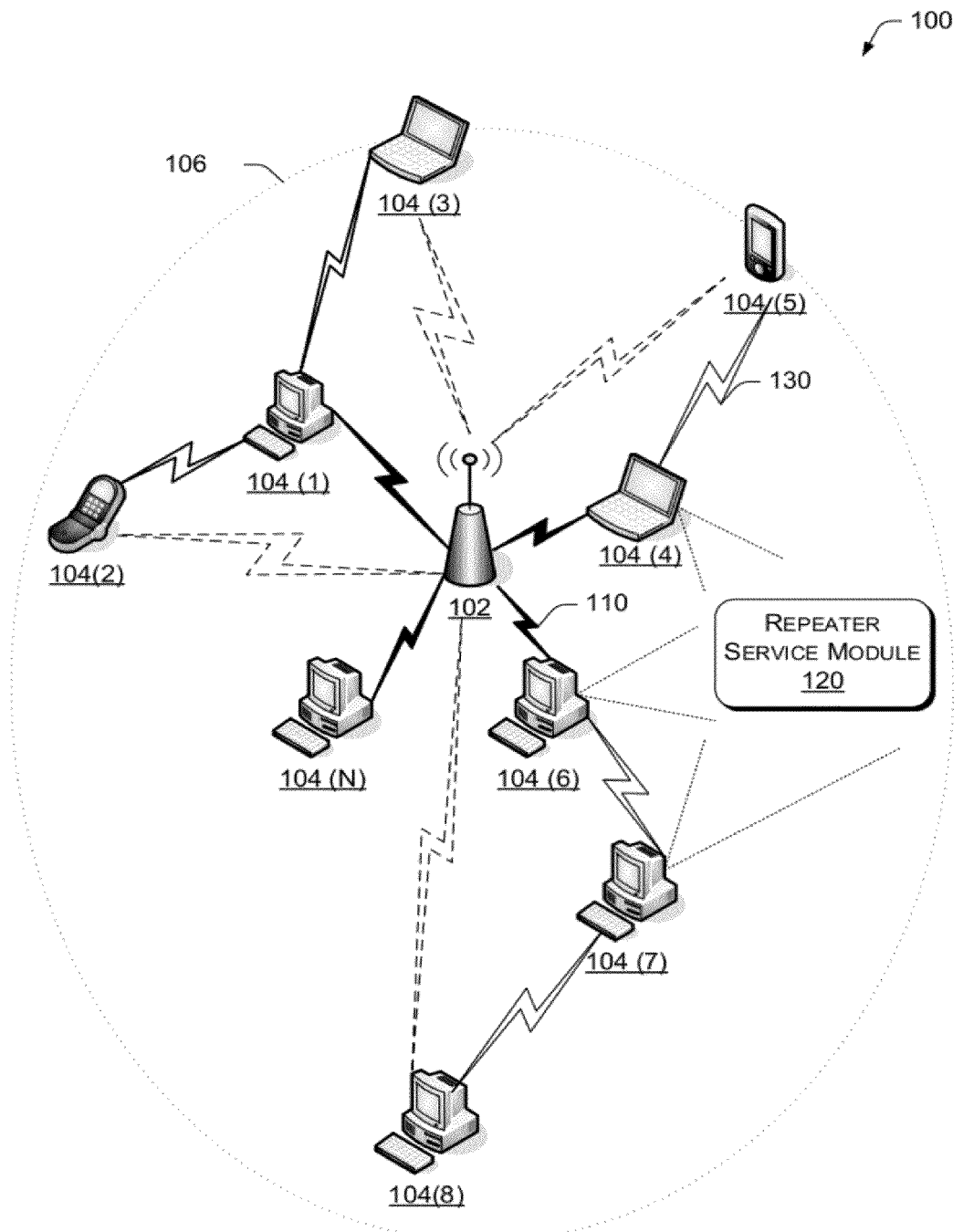
FIG. 1 illustrates an exemplary environment in which opportunistic use of stations as repeaters may be implemented.

This disclosure is directed towards implementing opportunistic use of wireless network stations as repeaters to improve the performance of a wireless network. A common performance problem faced by wireless networks is called a rate anomaly problem. The rate anomaly problem occurs when a station capable of communicating at a higher data rate communicates at a lower rate because of the presence of other wireless stations transmitting data at lower rates within the interference range of the station. The reasons for transmitting data at lower than capable rates are manifold. In one scenario, the other wireless stations may transmit at lower rates due to the relative greater distance from the access point. In another situation, it could be the use of a wireless network card capable only of transmitting data at lower rates, such as the use of IEEE 802.11b cards instead of IEEE 802.11g cards. The rate anomaly problem is caused in a wireless network because of the per-packet fair protocol currently employed by wireless networks. Thus, when a wireless medium is shared by stations communicating at different data rates, the protocol allows stations communicating at lower rates to consume more airtime and thereby limit the maximum throughput of the other stations in the wireless network.

Opportunistic Use of the wireless network stations as repeaters provides a method of reducing the rate anomaly suffered by stations in a wireless network. In an example, where the stations are placed at relatively different distances from an access point, rate anomaly may occur due to farther away stations communicating at lower rate. However, in this wireless network, while the relative distance between these stations and the access point may be large, the distance to other stations closer to the access point may be lower. Now, in this case, the rate anomaly problem could be alleviated if stations situated relatively closer to the access point can transform themselves into repeaters for stations lying further away from the access point. Upon such a transformation, the further lying stations can communicate with the closer stations at higher data rate as the distance between these stations is lower and the airtime of the access point is only consumed by stations communicating at higher data rates. Thus, the closer stations communicate both the packets received from the further station and those of their own to the access point at higher data rates thereby improving the performance of the wireless network.

In this example, the above transformation by stations is achieved by activating a repeater function in the stations. The repeater function may be implemented as software, which does not require the use of additional hardware. A station may initiate the repeater function by starting an ad hoc network (say a repeater network) in tandem with the original wireless network. This can be achieved by abstracting the wireless network interface into multiple virtual instances with each virtual instance appearing as an independent network interface to the users. The repeater function switches between the repeater network and the original wireless network to provide an illusion of simultaneous connectivity on all wireless networks. The station invites stations with lower data rate to connect to the repeater network and to communicate to the access point via the station activating the repeater network. This has the apparent effect of freeing the wireless network of stations with lower data rates and thereby improving the performance of the wireless network.

Additionally in an implementation, the capacity of a wireless network can be increased by employing a network coding protocol. The repeater function naturally lends itself to the use of network coding protocol with greater efficiency. Wireless networks employing network coding protocols operate at lower than capable capacity due certain necessary overheads. For example, coded packets have lower payload because the IP header of these packets need to carry more information to identify the contents of the coded packet. Further, packets in local buffer need to be continuously broadcasted to all the stations for the purpose of decoding.

In this implementation, the repeater functionality dispenses with the need to add additional bytes to the coded packet header by leveraging the traffic patterns of the stations utilizing the repeater functionality. For example, the network coding protocol mixes a packet bound for the access point from a first station with a packet from the access point for the first station. The mixing occurs at the station where the repeater function is activated and the mixed or coded packet is broadcast over the wireless network. While all the stations on the wireless network may receive the coded packet only the access point and the transmitting station can decode this coded packet. The access point and the transmitting station decode the coded packet by removing the packet sent by the respective station. The sent packets are stored locally in the buffer of the respective station and this allows for the decoding. Thus, due to the repeater functionality, both the need for adding bytes to the header and for continuous transmission of packets stored in local buffer are eliminated allowing greater capacity realization from the wireless network.

Multiple and varied implementations and embodiments are described below. In the following section, an exemplary environment that is suitable for practicing various implementations is discussed. After this discussion, representative implementations of systems, devices, and processes for implementing the coverage-based image relevance ranking are described.

Exemplary Environment

FIG. 1 illustrates an exemplary environment 100 that is suitable for opportunistic use of stations as repeaters. For discussion purposes, environment 100 includes at least one access point 102 that may be linked wirelessly to a plurality of devices, represented by stations 104(1), 104(2) . . . 104(N). The access point 102 has a wireless range indicated by the circle 106. The stations 104 are linked wirelessly via a wireless network 110.

The stations 104 may be implemented as any of a variety of devices capable of communicating wirelessly, including, for example, a computer, such as desktop personal computer (PC), a workstation, a portable computer (e.g., a laptop, a notebook, a tablet, etc.). Other devices include, for example, a personal digital assistant (PDA), a communication device such as a cellular phone, and so forth. In the exemplary environment 100, multiple stations 104(1)-104(N) are illustrated including computers 104(1), 104(6), 104(7), 104(8), 104(N) portable computers 104(3), 104(4), a cellular phone 104(2) and a personal digital assistant (PDA) 104(5). Each of the stations 104 may include at least one wireless network interface that allows for the station 104 to communicate wirelessly.

As shown in FIG. 1, the stations 104 may be equipped with a repeater service module 120 to implement opportunistic use of stations as repeaters. When a station 104(N) suffers from a rate anomaly problem, the repeater service module 120 transforms the station 104(N) into a repeater if such transformation alleviates the rate anomaly. Further, stations 104 may implement repeater service module 120 to extend the wireless range 106 of the access point 102. In such a situation, the stations authorized to access the access point 102 that may be beyond the wireless range 106 but within the wireless range of one or more of the stations 104 may access the wireless network through these one or more of the stations 104.

In one implementation, a station 104(1) capable of communicating at a higher data rate is curtailed by stations 104(2), 104(3), 104(5), 104(7) and 104(8) communicating at a lower data rate. The communication at lower data rates causes throughput degradation for the station 104(1), which produces rate anomaly at station 104(1). The stations 104(2), 104(3), 104(5), 104(7), 104(8) may be communicating at a lower data rate with the access point 102 due to the greater distance from the access point 102. The repeater service module 120 at the station 104(1) detects the rate anomaly experienced at station 104(1). The repeater service module 104(1) then determines if the activation of the station 104(1) as a repeater for some or all of the other stations 104(2), 104(3), 104(5), 104(7), 104(8) would alleviate the rate anomaly experienced at the station 104(1). Accordingly, the repeater service module 120 activates the repeater function at the station 104(1) for the stations 104(2) and 104(3). The repeater function sets up a repeater network 130 between the stations 104(1), and 104(2) and 104(3). Upon such activation, the wireless network 110 between the stations 104(2), 104(3) and the access point 102 is deactivated. The lesser distance between the stations 104(2) and 104(3) and station 104(1) as compared to the access point 102 allows for higher data rate transmissions between the stations 104(2), 104(3) and 104(1). Thus, by acting as repeater, the station 104(1) communicates with access point 102 at a higher data as it is not curtailed by the lower data rates of the stations 104(2) and 104(3) raising the overall data rate of the wireless network 110.

In another implementation, the repeater service 120 at station 104(5) detects a rate anomaly problem in the network. The repeater service module 120 determines if the activation of the repeater function at the station 104(5) would alleviate the rate anomaly problem. As the distance between the access point 102 and the station 104(5) is greater than the distance between the access point 102 and the stations 104(1), 104(4), 104(6), 104(N), activating a repeater function would not alleviate the rate anomaly. Thus, the repeater service module 120 at the station 104(5) broadcasts a message requesting activation of repeater function at the stations closer to the access point 102. In response to such a request, the station 104(4) may activate a repeater function and allow the station 104(5) to use the repeater function.

In another implementation, the repeater service 120 at the station 104(4) constantly collects information from the station 104(4) and the neighboring stations 104(1), 104(2), 104(3), 104(5) 104(6), 104(7), 104(8) . . . 104(N). The information includes MAC identifiers of the stations, number of packets heard, average size of packets heard, RSSI and data rate of data packets received, and BSSID of associated network. The repeater service module 120 at the station 104(4) calculates the utilization of the wireless medium by adding the airtime consumed by all the stations 104(1)-104(N). On the basis of the collected information and the calculated utilization, the repeater service determines the existence of the rate anomaly in the wireless network. Upon making the determination, the repeater service module 120 activates the repeater function at the station 104(4) if such activation would alleviate the rate anomaly in the system.

In another implementation, the repeater service module 120 at station 104(4) detects a rate anomaly at the station 104(4). The repeater service module 120 initiates a repeater protocol to communicate with the other stations 104(1), 104(2), 104(3), 104(5) 104(6), 104(7), 104(8) . . . 104(N) to determine the utility of employing the repeater function at the station 104(4). The repeater protocol includes broadcasting a message from the station 104(4) to each of the other stations 104(1), 104(2), 104(3), 104(5) 104(6), 104(7), 104(8) . . . 104(N) with the estimated data rates of each of the other stations if repeater function is activated, receiving utility of the repeater function to the other stations 104(1), 104(2), 104(3), 104(5) 104(6), 104(7), 104(8) . . . 104(N) as calculated by each of the other stations 104(1), 104(2), 104(3), 104(5) 104(6), 104(7), 104(8) . . . 104(N), broadcasting actual utility to a revised set of the other stations, say 104(5), 104(7), based on the utility received from the other stations 104(1), 104(2), 104(3), 104(5) 104(6), 104(7), 104(8) . . . 104(N), and receiving from each of the revised set of the other stations, say 104(5), 104(7), decisions regarding participation. The repeater service module 120 activates the repeater function at the station 104(4) based on the decisions provided by the revised set of other stations 104(5) and 104(7).

In another implementation, the repeater service module 120 at the station 104(4) detects the rate anomaly problem in the network and activates the repeater function at the station 104(4). The repeater function at the station 104(4) serves, for example, the station 104(5). Further, if for example, the station 104(5) communicates with the station 104(4) on the same channel as that used by the station 104(4) to communicate with the access point 102, then the repeater service module 120 may implement a network coding protocol to improve the performance of the wireless network 110. The network coding protocol is implemented by mixing a packet from the access point 102 for the station 104(5) with a packet from the station 104(5) for the access point 102 at the station 104(4) and broadcasting the mixed packet to all the stations on the network. In one implementation, the mixing is achieved by XORing the two packets. In another implementation, the station 104(4) unicasts the mixed packet to the station farthest from station 104(4). In this case, the station 104(5) is farther than the access point 102 for the station 104(4). Unicasting, instead of broadcasting, the message allows the station 104(4) to confirm the receipt of the mixed packet at the farthest station 104(5). The confirmation of such receipt would indicate the receipt of the mixed packet by all the other stations, including the access point 102 and the station 104(5). The station 104(5) and the access point 102 can decode the mixed packet by removing the packets sent by that station or access point. The previously sent or received packets are buffered to allow for such decoding. The mixed packets intercepted at any other station, say the station 104(N), may not be decoded as neither of the packets was sent by the station 104(N).

In another implementation, the repeater service module 120 at the station 104(6) may detect the existence of the rate anomaly problem and activate the repeater function. The repeater service module 120 may determine that the participation of the station 104(7) may alleviate the problem but not the participation of the station 104(8). The repeater service module 120 at either the station 104(6) or 104(7) may still detect the existence of the rate anomaly problem due to the lower data rate of the station 104(8). Thereafter, the repeater service module 120 at the station 104(7) may activate a repeater function at the station 104(7) to serve the station 104(8) to alleviate the rate anomaly problem. In another implementation, the repeater service module 120 at the station 104(6) may indicate to the repeater service module 120 at the station 104(7) to activate the repeater function to alleviate the rate anomaly.

In another implementation, the repeater service module 120 at the station 104(7) may detect the rate anomaly problem and activate a repeater function to serve another station, say the station 104(8). Further, the repeater service module 120 at the station 104(6) may detect the existence of a rate anomaly and activate a repeater function to serve another station, say the station 104(7) that is already serving the station 104(8).

Exemplary Computing Device

Figure 2:
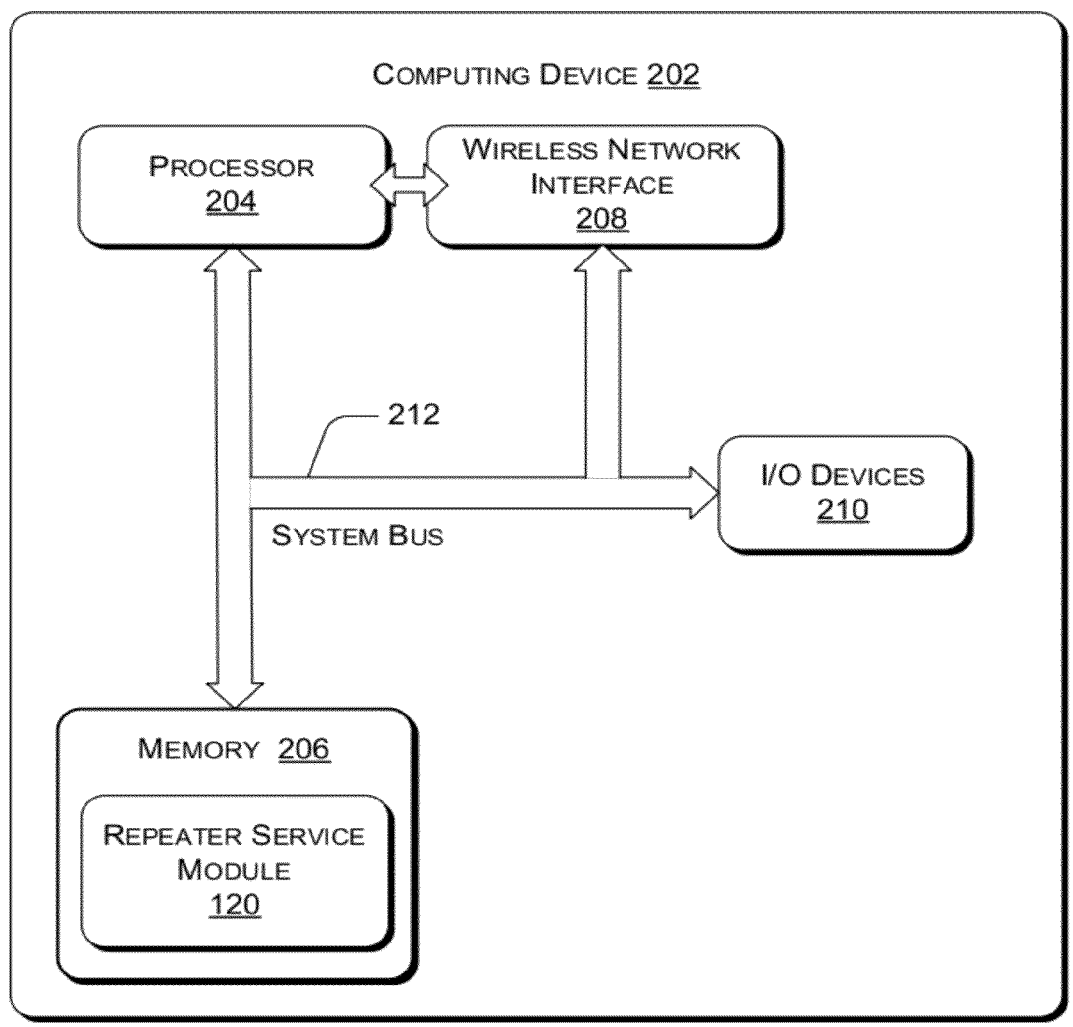
FIG. 2 is a block diagram illustrating an exemplary computing device for implementing opportunistic use of stations as repeaters.

FIG. 2 illustrates various components of an exemplary computing device 202 suitable for implementing opportunistic use of stations as repeaters. The computing device 202 is representative of any one of the devices shown in FIG. 1 as stations 104. The computing device 202 can include, but is not limited to, a processor 204, a memory 206, a wireless network interface 208, Input/Output (I/O) devices 210 (e.g., keyboard and mouse) and a system bus 212 that operatively couples various components including processor 204 to memory 206.

System bus 210 represents any of the several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, a Peripheral Component Interconnects (PCI) bus also known as a Mezzanine bus, a PCI Express bus, a Universal Serial Bus (USB), a Secure Digital (SD) bus, or an IEEE 1394 (i.e., FireWire) bus.

Memory 206 includes computer-readable media in the form of volatile memory, such as Random Access Memory (RAM) and/or non-volatile memory, such as Read Only Memory (ROM) or flash RAM. Memory 206 typically includes data and/or program modules for implementing opportunistic use of stations as repeaters that are immediately accessible to and/or presently operated on by processor 204. In one embodiment, memory 206 includes the repeater service module 120, which may be implemented as computer software or firmware composed of computer-executable instructions that may be executed on the processor 204.

Wireless network interface 208 includes network card that can connect to a radio-based computer network, such as IEEE 802.11b/g wireless cards. The wireless network interface 208 employed in the computing device should be capable of supporting a promiscuous mode, which allows the wireless network interface 208 to hear packets not directed to it. Further, the wireless network interface 208 may be detachable from the computing device 202 and may be plugged into the device when the wireless capability is required. In certain embodiments, the wireless network interface 208 may be integrated with the processor or be communicatively coupled to the processor.

Though FIG. 2 shows the repeater service module 120 as residing on the computing device 202, it will be understood that the repeater service module 120 need not be hosted on the computing device 202. For example, the repeater service module 120 could also be hosted on a storage medium communicatively coupled to the computing device 202. This includes the possibility of the repeater service module 120 being hosted in whole, or in part, on the computing device 202. Further, in other implementations, the repeater service module 120 may be integrated into the wireless network interface 208. In another implementation, the wireless network interface 208 may be integrated into the processor and may be accessed by the repeater service module 120.

Generally, program modules executed on the components of computing device 202 include routines, programs, objects, components, data structures, etc., for performing particular tasks or implementing particular abstract data types. These program modules and the like may be executed as a native code or may be downloaded and executed such as in a virtual machine or other just-in-time compilation execution environments. Typically, the functionality of the program modules may be combined or distributed as desired in various implementations.

An implementation of these modules and techniques may be stored on or transmitted across some form of computer-readable media. Computer-readable media can be any available media that can be accessed by a computer. By way of example, and not limitation, computer-readable media may comprise computer storage media that includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium, which can be used to store the desired information and which can be accessed by a computer.

Figure 3:
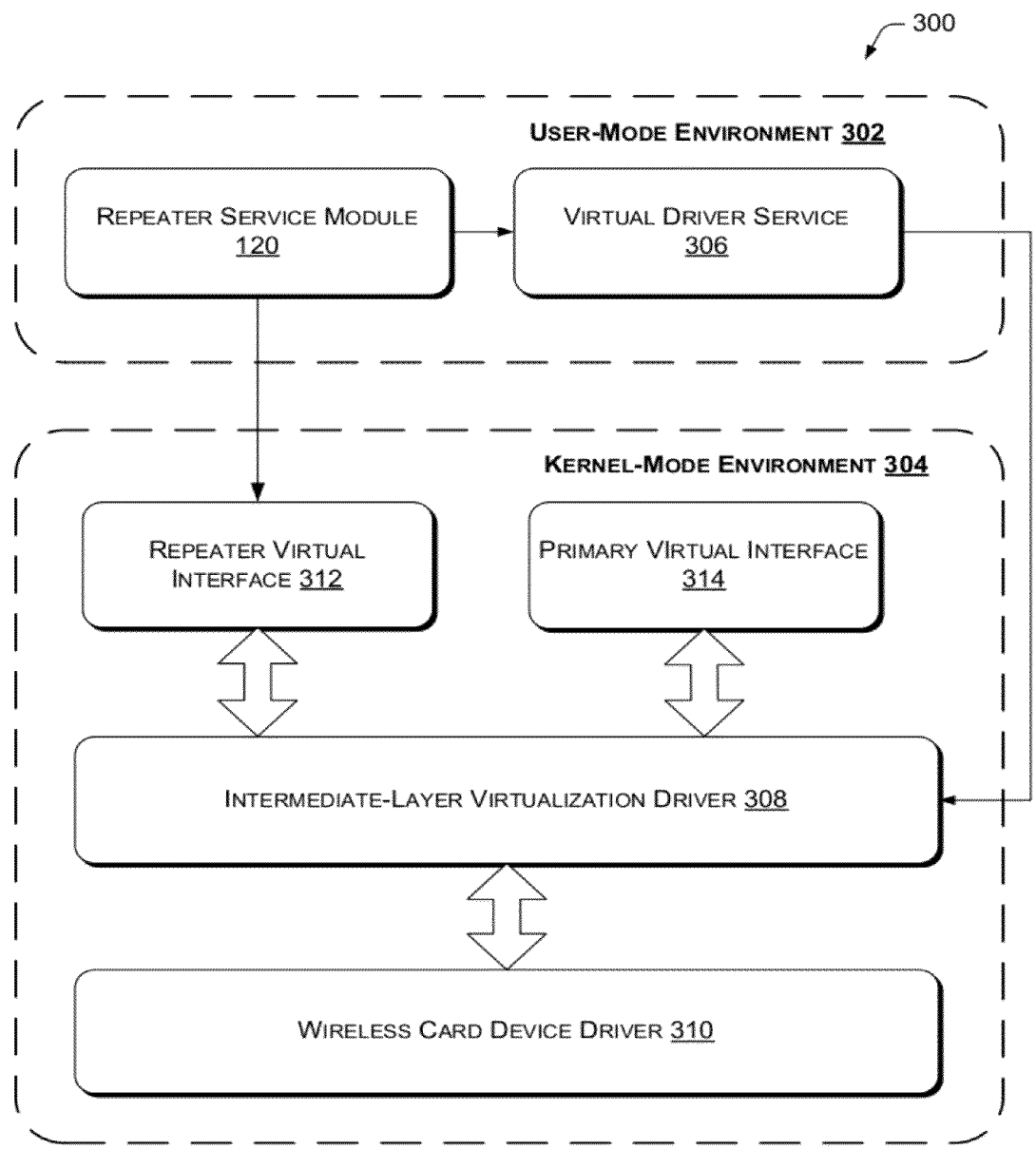
FIG. 3 is a block diagram illustrating an exemplary architecture for implementing opportunistic use of stations as repeaters.

FIG. 3 illustrates an exemplary architecture 300 for implementing opportunistic use of stations as repeaters. The exemplary architecture 300 allows for the transformation of a station, say 104(N), into a repeater without additional hardware. While repeaters are implemented as physical or MAC layer repeaters, the exemplary architecture 300 implements the repeater as an intermediate layer repeater. In one implementation, the repeater may be implemented in the intermediate layer between the MAC and network layer. Such an implementation is made possible by creating multiple virtual instances of wireless network interface 208. The various modules, such as repeater service module 120, may be implemented in a combination of kernel mode and user mode environment to achieve the above implementation.

The direction of the arrows in FIG. 3 indicates the direction of data flow in accordance with an implementation. The system 300 includes a user-mode environment 302 and a kernel-mode environment 304. In one implementation, the user mode environment 302 includes a repeater service module 120 and a virtual driver service 306. The repeater service module 120 determines the activation of the repeater function. When the station is not acting as a repeater, the repeater service module 120 and the virtual driver service 306 are inactive. The virtual driver service 306 is activated by the repeater service module 120 when the repeater function needs to be activated at the station.

The kernel-based environment 304 includes an intermediate-layer virtualization driver 308, a wireless card device driver 310, a repeater virtual interface 312, and a primary virtual interface 314. In one implementation, the virtual driver service 306 when activated loads an intermediate-layer virtualization driver 308 in the kernel-based environment. In one implementation, the virtualization driver 308 is implemented in the intermediate layer above MAC layer but below the IP layer.

Upon loading the virtualization driver 308 in the kernel-based environment 304, the virtualization driver 308 interacts with the wireless card device driver 310 to abstract the wireless network interface 208 into multiple instances allowing a single wireless network interface to support multiple wireless networks. In one implementation, the abstraction of the wireless network interface 208 by the virtualization driver 308 is manifested in the form of a repeater virtual interface 312 and a primary virtual interface 314. The repeater virtual interface 312 provides for the repeater functionality. The primary virtual interface 314 provides for the original wireless network after virtualization. The repeater service module 120 loads the repeater virtual interface 312 with the details of the repeater function to activate the repeater network.

In one implementation, the wireless card device driver 310 may be modified to allow for faster switching between the wireless network and the repeater network. This may be achieved by eliminating redundant scans carried out by the wireless network interface 208 and avoiding caching a state of the wireless network already undertaken by the virtualization driver 308.

Figure 4:
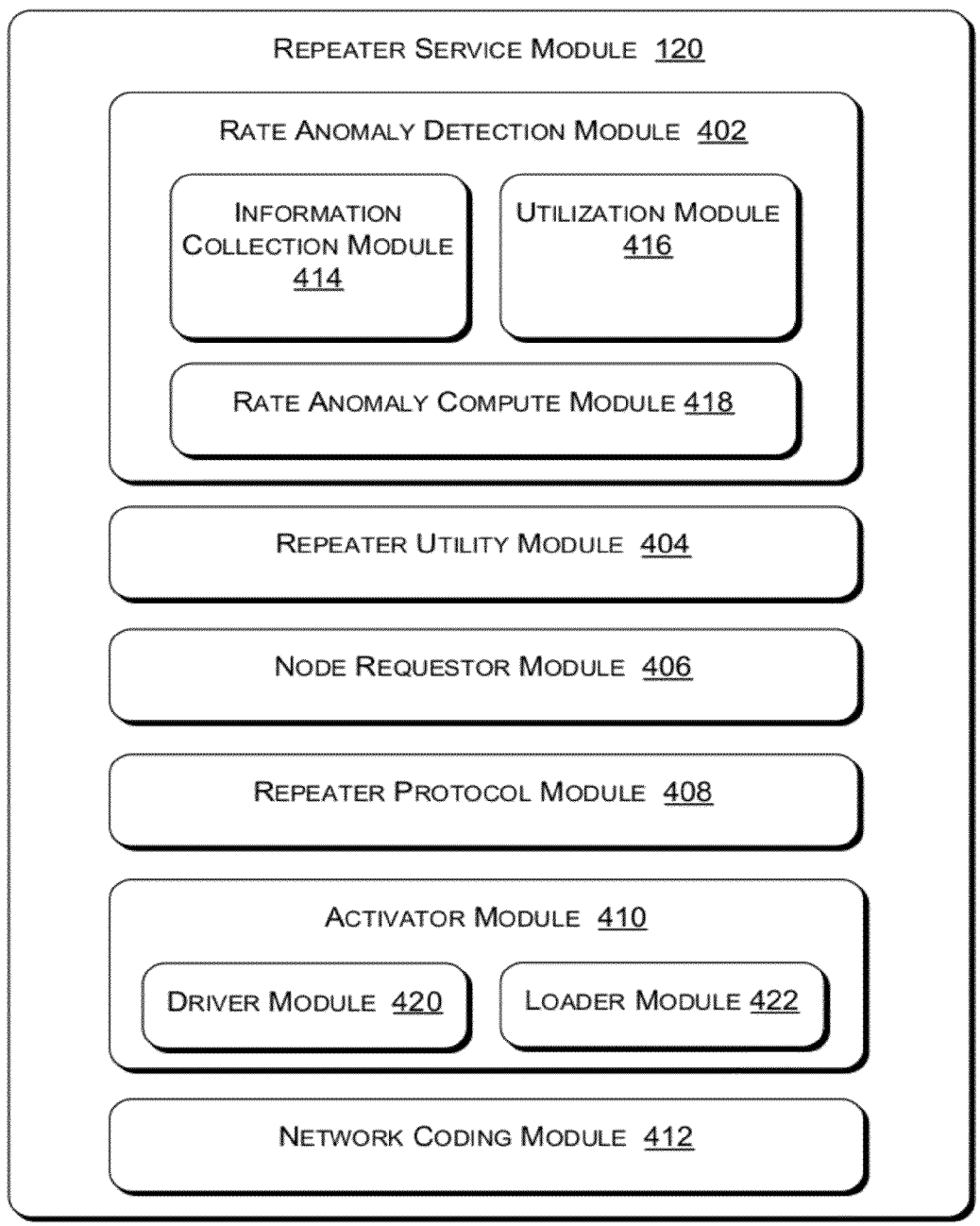
FIG. 4 is a block diagram illustrating one exemplary module for computing the coverage-based image relevance ranking.

FIG. 4 shows an exemplary implementation of the repeater service module 120. The repeater service module 120 includes a rate anomaly detection module 402, a repeater utility module 404, a node requestor module 406, a repeater protocol module 408, an activator module 410 and a network coding module 412.

The rate anomaly detection module 402 identifies the existence of a rate anomaly suffered by the device employing the repeater service module 120. The rate anomaly detection module 402 may further include an information collection module 414, a utilization module 416 and a rate anomaly compute module 418. The following example illustrates how the rate anomaly is identified or determined by the rate anomaly detection module 402 with reference to FIG. 1. For the purpose of this example, station 104(4) employs a repeater service module 120 having a rate anomaly detection module 402 that detects the rate anomaly experienced by the station 104(4). The information collection module 414 in the rate detection anomaly module 402 continuously monitors information regarding the station 104(4) and the neighboring stations 104(1), 104(2), 104(3), 104(5) 104(6), 104(7), 104(8) . . . 104(N) in the wireless network. The information collected includes the MAC identifiers of the stations 104(1), 104(2), 104(3), 104(5) 104(6), 104(7), 104(8) . . . 104(N), number of packets heard from the other stations 104(1), 104(2), 104(3), 104(5) 104(6), 104(7), 104(8) . . . 104(N), average size of the packets heard, the RSSI and data rate of the packets heard, and BSSID of the wireless network. The information may be maintained as aggregated information in a table where each row corresponds to a MAC identifier of a neighboring station 104 from which the station 104(4) heard packets. An exemplary table to illustrate the information table is provided below.

TABLE 1

Information Collection Table

| MAC Identifier | No. of Packets heard from other node | Average size of packet | RSSI and Data rate of packet | BSSID of wireless network |
| --- | --- | --- | --- | --- |
| . . . (104(1)) | . . . | . . . | . . . | . . . |
| . . . (104(2)) | . . . | . . . | | |
| . . . (104(3)) | | | | |
| . . . (104(5)) | | | | |
| . . . | | | | |

In the example, the rate anomaly detection module 402 employs a utilization module 416 to compute utilization of the wireless medium used by the wireless network. In one implementation, the rate anomaly detection module computes utilization by summing the airtime consumed by all the other stations 104(1), 104(2), 104(3), 104(5) 104(6), 104(7), 104(8) . . . 104(N). The rate anomaly compute module 418 computes the rate anomaly by comparing the utilization of the wireless medium with the collected information. In one implementation, the rate anomaly compute module 418 makes this determination if the utilization of the wireless medium is greater than a threshold and the neighboring stations 104(1), 104(2), 104(3), 104(5) 104(6), 104(7), 104(8) . . . 104(N) send the same fraction of packets at a lower data rate. In one implementation, the threshold may be set at 50%.

Based on the rate anomaly suffered by the device, the repeater utility module determines whether activation of the repeater function would be beneficial to the device based on the expected throughput improvement, burden on system resources and security concerns to the device and the overall wireless network due to the activation. The node requestor module 406 determines whether activating the repeater function at another station would alleviate the rate anomaly and if such activation would alleviate the rate anomaly, sending a request to the other stations to activate a repeater function. The following example illustrates the working of the node requestor module 406 in the context of FIG. 1. For the purpose of this example, the station 104(5) detects the rate anomaly problem in the wireless network. Due to the relatively large distance between the access point 102 and the station 104(5), the data rate achieved by the station 104(5) is low. However, the stations 104(1), 104(4), 104(6) are relatively closer to the access point 102 and can communicate with the access point 102 at higher data rates. Thus, the node requestor module 406 at the station 104(5) sends a request to the other stations 104(1), 104(4), 104(6) to activate repeater function at the other stations 104(1), 104(4), 104(6). In another example, where the station 104(4) detects the rate anomaly problem, the node requestor module 406 may not process a request to other stations 104(1), 104(6) as the activation of the repeater function may alleviate the rate anomaly problem by serving the stations 104(5).

Figure 5:
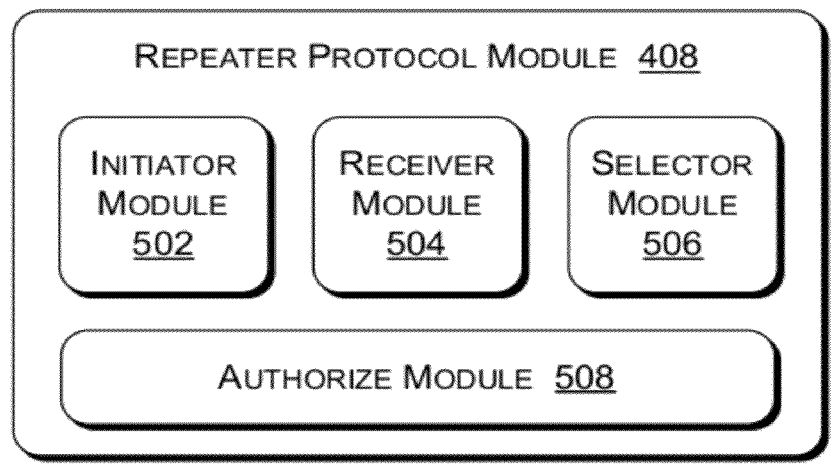
FIG. 5 is a block diagram illustrating an exemplary module for initiating a repeater protocol.

Prior to the activation of the repeater function, the repeater protocol module 408 initiates a repeater protocol to determine the viability of activating the repeater function and to determine the stations that will utilize the repeater function. FIG. 5 shows an implementation of the repeater protocol module 408. The repeater protocol module 408 includes an initiator module 502, a receiver module 504, a selector module 506, and an authorize module 508. An example of the functioning of the repeater protocol module 408 with reference to FIG. 1 is provided below. The station 104(4) may detect the rate anomaly problem or be requested to activate the repeater function to alleviate the rate anomaly experienced by the stations in the wireless network. The repeater service module 120 at the station 104(4) implements the initiator module 502. The initiator module 502 broadcasts a message with the estimated data rates if repeater function is utilized over the wireless network. The message also has the IP addresses of some of the other stations 104(1), 104(2), 104(3), 104(5) 104(6), 104(7), 104(8) . . . 104(N) so that any station 104 receiving the message can assimilate the estimated data rate it would experience if the repeater function is utilized. The stations 104(1), 104(2), 104(3), 104(5) 104(6), 104(7), 104(8) . . . 104(N) respond with a message with the actual utility to the responding station. The receiver module 504 receives the message with the actual utility to the other stations 104(1), 104(2), 104(3), 104(5) 104(6), 104(7), 104(8) . . . 104(N).

The selector module 506 recalculates utility to the other stations 104(1), 104(2), 104(3), 104(5) 104(6), 104(7), 104(8) . . . 104(N) based on the received message. The selector module 506 then selects a revised set of the other stations, say the stations 104(3), 104(5), 104(7), and broadcasts a message with recalculated utility requesting participation with the IP addresses of the revised set of the stations 104(3), 104(5), and 104(7). The stations 104(3), 104(5) and 104(7) respond to the message with their decision regarding participation. For example, 104(3) and 104(7) may decide not to participate on the repeater for various reasons such as, better data rate by participating with another station, or security concerns. The station 104(5) may decide to utilize the repeater function at the station 104(4) and may send decision in favor of participation. The authorize module 508 upon receiving enough number of affirmative decisions for participation may authorize the activation of the repeater function at the station 104(4).

The repeater service module 120 includes an activator module 410 that activates the repeater function at a device. The activator module 410 includes a driver module 420 and a loader module 422. In one implementation, the driver module 420 activates the virtual driver service 306 as shown in FIG. 3. The virtual driver service 306 loads a virtualization driver 308, which abstracts the wireless network interface into multiple instances, two of which are represented as the repeater virtual interface 312 and primary virtual interface 314. The loader module 422 supplies the details of the repeater function to the repeater virtual interface 312. Based on the details provided by the loader module 422, the repeater function is activated in the form of a repeater network that alternates with the wireless network.

In one implementation, the repeater service module 120 may include a network coding module 412 to improve the performance of the network by reducing the overall time taken for packet transmission across different stations. An example of the functioning of the network coding protocol with reference to FIG. 1 is provided below. For the purpose of discussion, it may be presumed that the repeater function at station 104(4) has been activated and the station 104(5) utilizes the repeater function activated at the station 104(4). Upon activation, packets from the station 104(5) intended for the access point 102 are directed to the station 104(4) and vice versa. The station 104(4) transmits each packet received to the intended recipient. For the purpose of illustration, it may be assumed that the receipt and transmission of a packet by the station 104(4) takes one time unit each. Thus, in the above scenario, the station 104(4) takes four time units to transmit the packets from the station 104(5) to the access point 102 and vice versa. By employing network coding protocol, the station 104(4) may transmit the packets in a shorter time period.

In the above example, the network coding protocol provides for the mixing of the packet from the station 104(5) and the access point 102 to be mixed at the station 104(4) and broadcasting the mixed packet over the wireless medium. For the purpose of illustration, assuming that receipt and transmission of a packet takes one time unit each, the total time taken for transmission would be the time taken for receiving the two packets from the station 104(5) and the access point 102 respectively, plus the time taken for broadcasting the mixed packet to all the stations. In this example, this time period could be as little as three time units. Though the mixed packet may be received by all the stations, it can be decoded by the access point 102 and the station 104(5). The mixed packet can be decoded by removing the packet sent by the respective node from the mixed packet.

Figure 6:
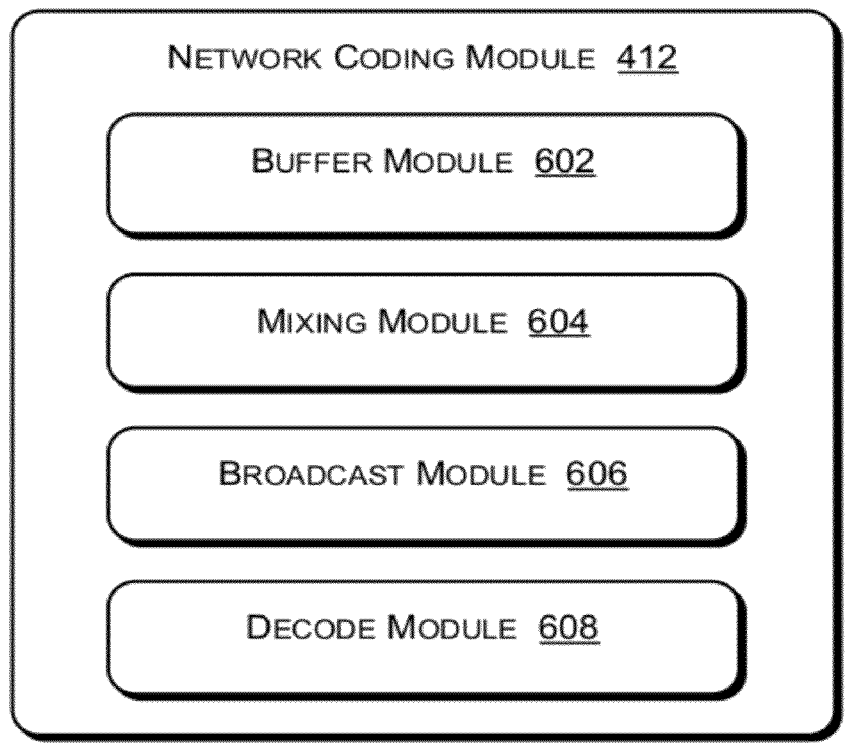
FIG. 6 is a block diagram illustrating an exemplary module for employing a network coding protocol.

FIG. 6 shows an implementation of the network coding module 412. The network coding module 412 includes a buffer module 602, a mixing module 604, a broadcast module 604, and a decode module 608. An example of the functioning of the network coding module 412 is provided below with reference to FIG. 1. For the purpose of illustration, the repeater function at the station 104(4) has been activated to set up a repeater network and the station 104(5) utilizes the repeater function. When the repeater network and the wireless network employ the same channel for communications, then the station 104(5) can activate the network coding module 412. The buffer module 602 buffers all recent packets sent by the station at the station. For example, the buffer module 602 on the station 104(4), 104(5) would buffer the packets sent by each these stations at these stations respectively. Similarly, it may be assumed that a similar buffer function is activated at the access point 102. The station 104(4) receives the packets from the access point 102 and the station 104(5) and the mixing module 604 mixes the two packets. In one implementation, the mixing module performs the binary function XOR on the two packets.

In the above implementation, the broadcast module 606 broadcasts this mixed packet to all the stations 104(1)-104(N). Thus, the mixed packet is received by all the stations. In one implementation, the broadcast module 606 unicasts the mixed packet to the station farthest from the station 104(4). For the purpose of discussion, this could be the station 104(2). The confirmation of receipt of the mixed packet at the station 104(2) may be taken as confirmation of receipt of the mixed packet by all the other stations. The decode module 608 at the station 104(5) decodes the received message based on the buffered packets at the station 104(5). For example, the station 104(5) removes from the mixed packet, the packet sent by it. Similar decode function is activated at the access point 102 to allow the access point to retrieve the packet from the station 104(5) for it from the mixed packet.

Exemplary Processes

Figure 7:
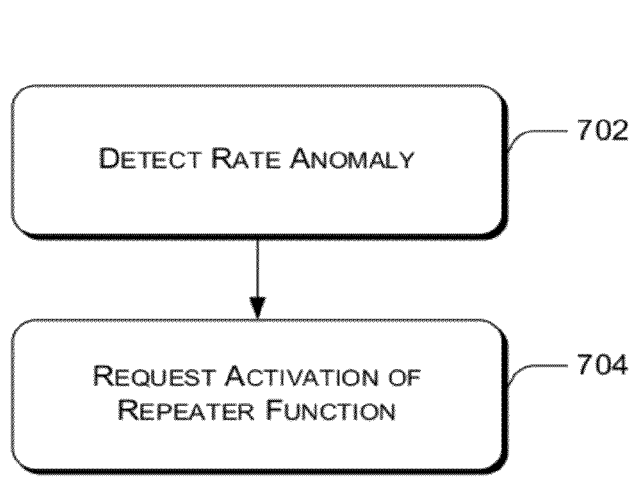
FIG. 7 is a flow diagram illustrating an exemplary process for implementing opportunistic use of stations as repeaters.

FIG. 7 illustrates an exemplary process 700 for implementing opportunistic use of stations as repeaters. The process 700 (as well as other processes described below) is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 700 (as well as other processes described below) is described with reference to environment 100 shown in FIG. 1 and computing device 202 shown in FIG. 2. It will be apparent to a person ordinarily skilled in the art that environment 100, computing device 202 are described for exemplary purposes and the process 700 (as well as other processes described below) may be implemented in other environments, systems or network architectures to comply with other optimization policies.

Generally, the process 700 transforms a station into a repeater for other stations to improve the data rate performance within a network. At block 702, a rate anomaly is detected. This occurs when a station, say 104(1), capable of transmitting data at a higher rate is curtailed by other stations, say 104(2), 104(3), transmitting data at a lower rate. This operation may be performed, for example, by the rate detection module 402 of the repeater service module 120.

At block 704, request for activation of a repeater function is made. The request may be made based on the utility of activating a repeater function to the rate anomaly. For example, due to the shorter distance between the station 104(1) and 104(2) as compared to the access point 102 and the station 104(2), the data rate between the station 104(1) and 104(2) may be higher than between the station 104(2) and the access point 102. Thus, activation of the repeater function at the station 104(1) may increase the overall data rate within the wireless network and alleviate the rate anomaly in the wireless network.

Figure 8:
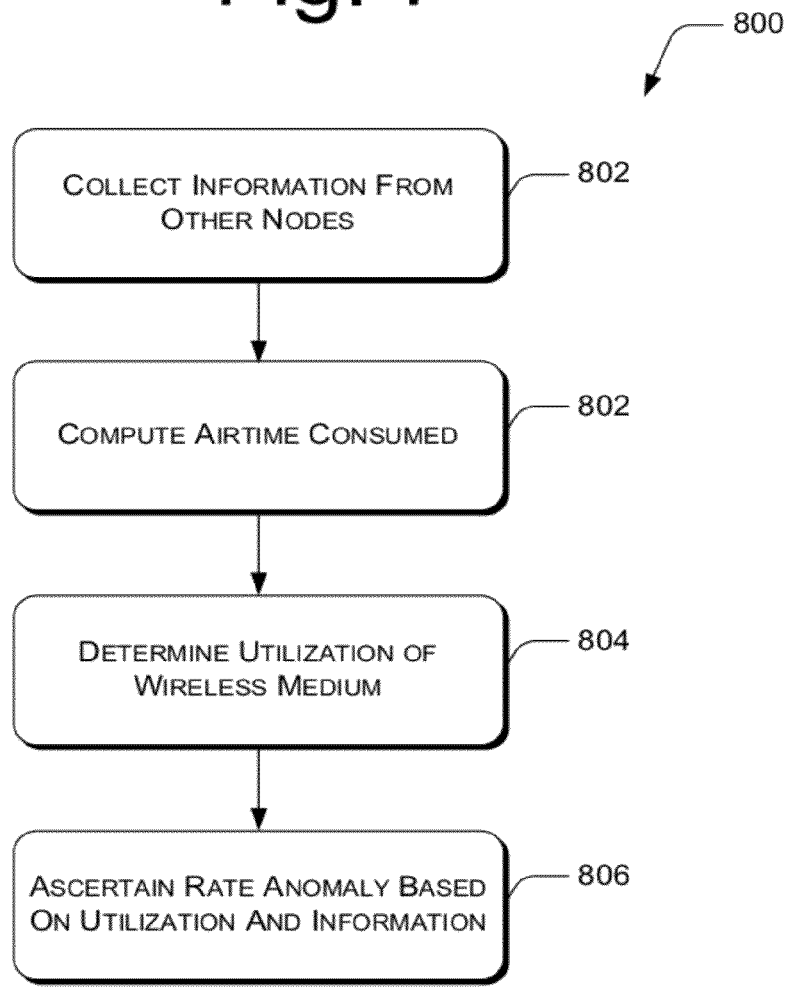
FIG. 8 is a flow diagram illustrating an exemplary process for detecting rate anomaly.

FIG. 8 illustrates an exemplary process 800 for detecting a rate anomaly. That is, process 800 is one possible implementation of the operation illustrated as block 702 in FIG. 7. At block 802, information relevant for detecting a rate anomaly is collected. For example, the information may include MAC identifiers of the stations, number of packets heard from the other stations, average size of the packets heard, the RSSI and data rate of the packets heard, and BSSID of the wireless network. This information may be stored in a table form as illustrated by table 1 provided above.

At block 804, the airtime consumed by the other stations is computed. In one example, the airtime for a station may be computed using the size of and number of packets received from the station and the data rate at which the packets were sent. At block 806, the utilization of the wireless medium is determined. One exemplary method of achieving this operation is by summing the airtime consumed by all the stations in a wireless network. At block 806, the rate anomaly is ascertained based on the information collected and the computed utilization. For example, rate anomaly may be inferred if the utilization of the wireless medium is more than a pre-determined threshold and the neighboring stations also suffer from throughput degradation. In one implementation, the threshold for utilization may be set at 50%.

The above process 800, for example, may be achieved by the repeater service module 120. The operation at block 802 may be achieved by the information collection module 414. The information collection module 414 accesses the wireless network interface 208 to collect the relevant information. The wireless network interface 208 is capable of providing such information when it supports the promiscuous mode. The operation at block 804 may be achieved by the utilization module 416 in FIG. 4. Similarly, the operation 806 may be achieved by the rate anomaly compute module 418.

Figure 9:
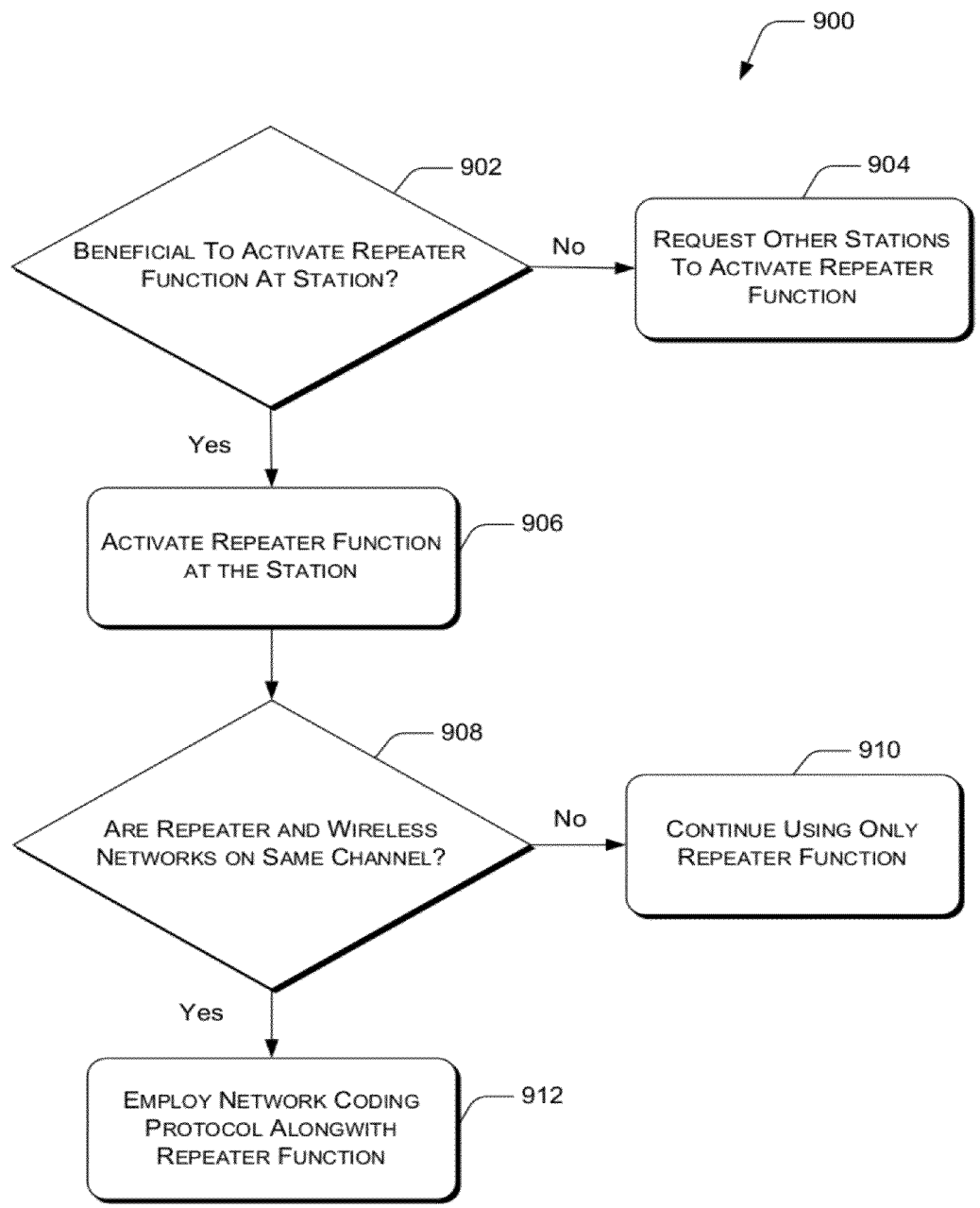
FIG. 9 is a flow diagram illustrating an exemplary process for implementing opportunistic use of stations as repeaters.

FIG. 9 illustrates an exemplary process 900 for activating repeater function and network coding protocol. The order in which the process is described is not intended to be construed as a limitation, and any number of the described method blocks can be combined in any order to implement the process, or an alternate process. Additionally, individual blocks may be deleted from the process without departing from the spirit and scope of the subject matter described herein. Furthermore, the process can be implemented in any suitable hardware, software, firmware, or combination thereof.

At block 902, the benefit of activating a repeater function at a node is analyzed. For example, in FIG. 1, the activation of repeater service at the station 104(5) does not alleviate the rate anomaly. This is because the station 104(5) is unable to communicate with the access point 102 at a higher rate due to the greater distance between the station 104(5) and the access point 102. In such instances, a request is sent to other stations for activation of the repeater function at block 904 (i.e., the 'No' branch from block 902). Where, however, the activation of the repeater function at the station would alleviate the rate anomaly, the repeater function is activated at block 906 (i.e., the 'Yes' branch from block 902). The operations at block 902 and 904 may be performed, for example, by the node requestor module 406 of the repeater service module 120.

At block 908, the channel utilized by the wireless network and the repeater network set up by the repeater function is compared. For example, the repeater network and the wireless network may be utilizing the same radio frequency for communication. Where, the repeater network and the wireless network are not on the same channel, a network coding protocol is not initiated, as in block 910 (i.e., the 'No' branch from block 908). In the case where the two networks communicate on the same channel, network coding protocol is employed alongside the repeater function, as in block 912 (i.e., the 'No' branch from block 908).

Figure 10:
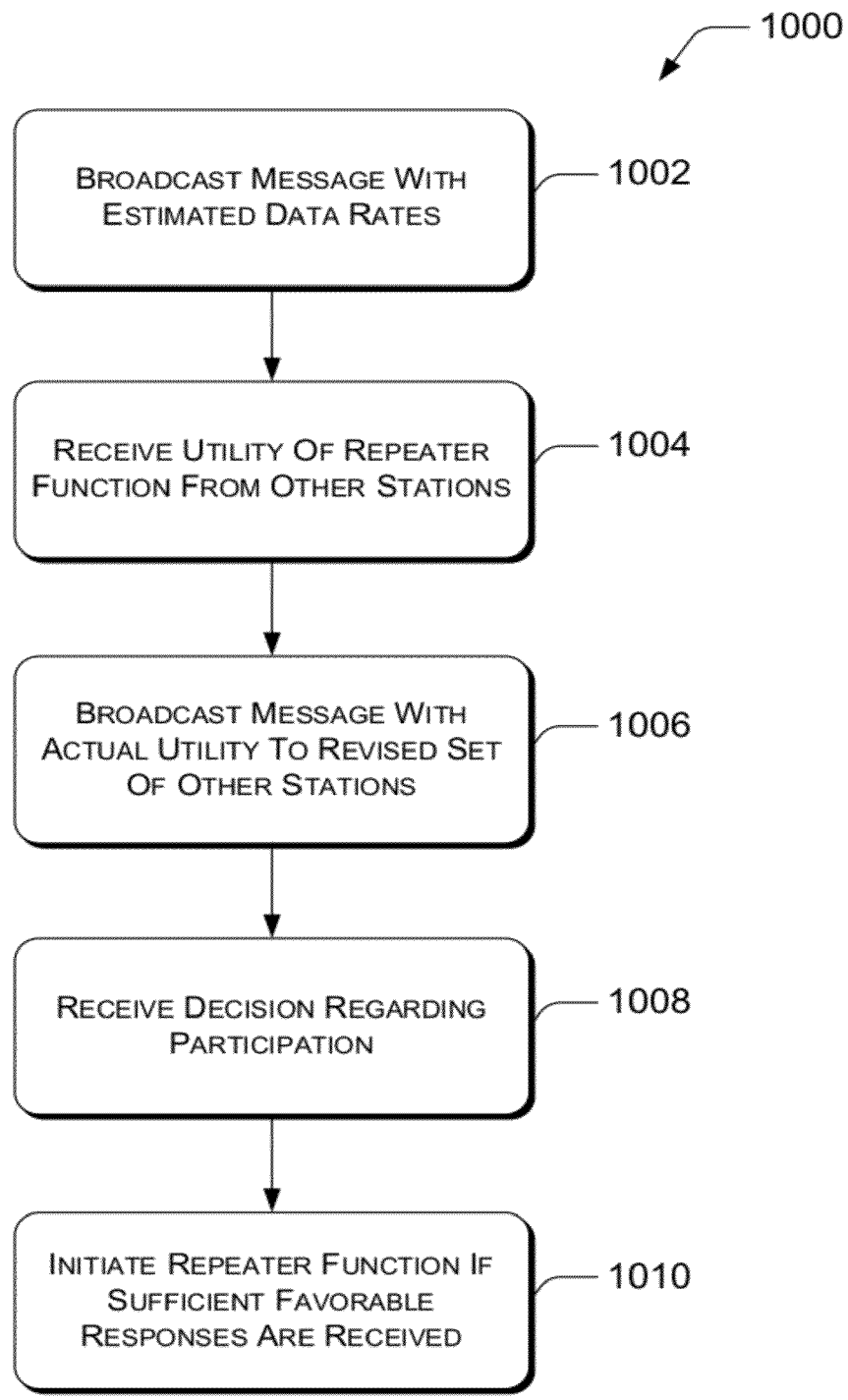
FIG. 10 is a flow diagram illustrating an exemplary process for initiating repeater protocol.

FIG. 10 illustrates an exemplary process 1000 to initiate a repeater protocol as part of the activation of the repeater function as provided at block 706. The order in which the process is described is not intended to be construed as a limitation, and any number of the described method blocks can be combined in any order to implement the process, or an alternate process. Additionally, individual blocks may be deleted from the process without departing from the spirit and scope of the subject matter described herein. Furthermore, the process can be implemented in any suitable hardware, software, firmware, or combination thereof.

At block 1002, a message with the estimated data rates of the other stations is broadcast over the wireless network. As one example, the repeater service module 120 at the station 104(1) may broadcast the message with the estimated data rates of the other stations 104(2), 104(3), 104(5), 104(7), 104(8). In one implementation, the above operation may be performed by the initiator module 502 in FIG. 5 as part of the repeater service module 120.

At block 1004, messages with actual utility to other stations because of the repeater function are received. The station 104(1) may receive the message with actual utility from the stations 104(2), 104(3), 104(5), 104(7), 104(8). This operation may also be performed by the receiver module 504 as part of the repeater service module 120.

At block 1006, message with recalculated utility is broadcast to a revised set of stations. The station 104(1) may recalculate the utility of the repeater function to the other stations and select certain nodes that would benefit from such activation. For example, the repeater function may benefit the stations 104(2) and 104(3) but not the stations 104(7) and 104(8). Thus, a message directed to the stations 104(2) and 104(3) may be broadcast. Further, this operation may be performed by the selector module 506 in FIG. 5.

At block 1008, messages from a revised set of stations are received with decisions regarding participation. The stations 104(2) and 104(3) may respond to the message broadcast by the station 104(1) with decisions regarding participation. At block 1010, based on the received messages, the initiation of the repeater function is authorized. The stations 104(2) and 104(3) may decide in favor of participation and this may trigger the repeater function at the station 104(1). If the stations 104(2) and 104(3) decide against participation, then the repeater function may not be activated at the station 104(1). In one implementation, the authorize module 508 in FIG. 5 may perform the operations provided at blocks 1008 and 1010.

Figure 11:
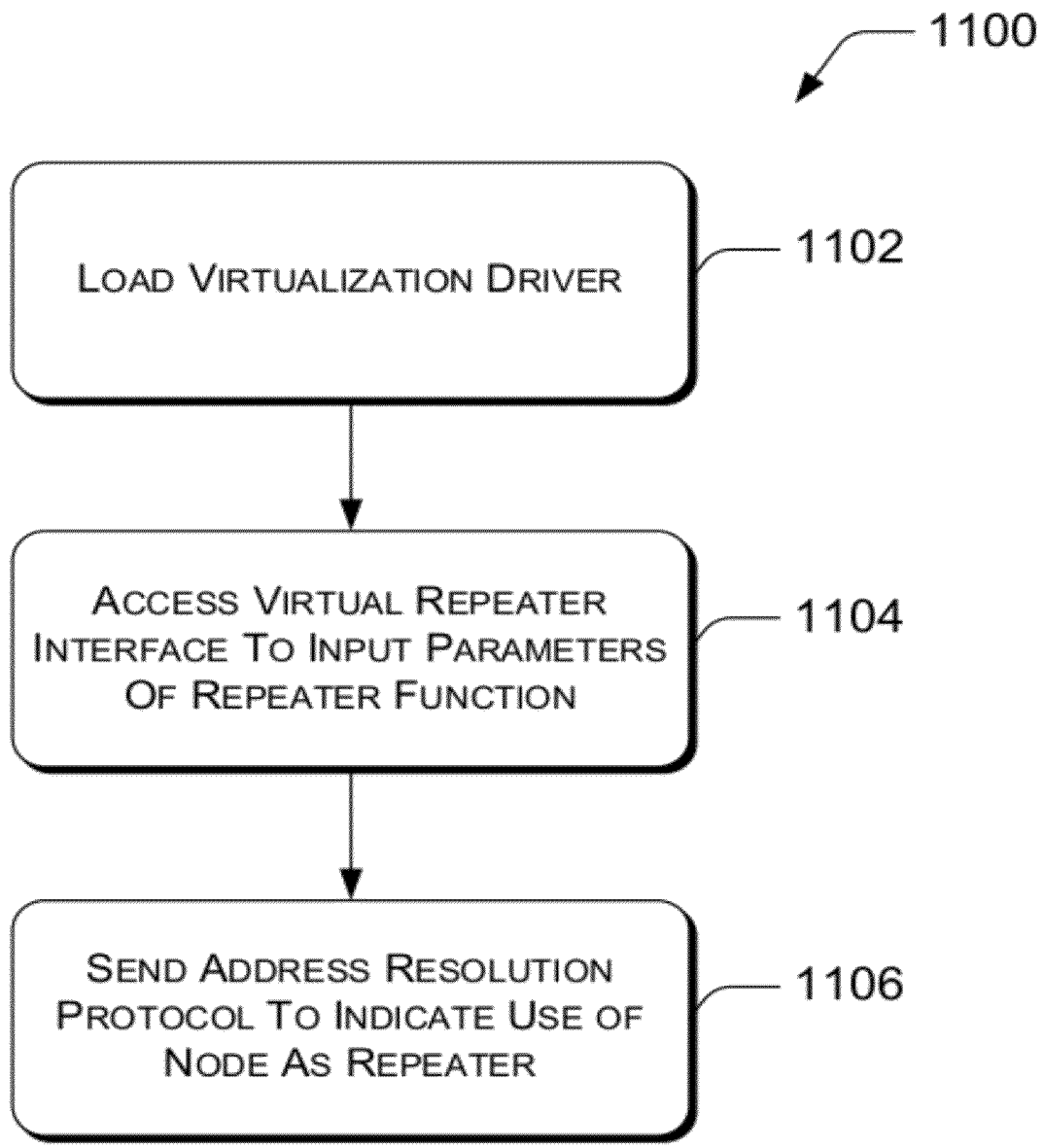
FIG. 11 is a flow diagram illustrating an exemplary process to establish a repeater network as part of the activation of the repeater function.

FIG. 11 illustrates an exemplary process 1100 to establish a repeater network as part of the activation of the repeater function as provided at block 706. The order in which the process is described is not intended to be construed as a limitation, and any number of the described method blocks can be combined in any order to implement the process, or an alternate process. Additionally, individual blocks may be deleted from the process without departing from the spirit and scope of the subject matter described herein. Furthermore, the process can be implemented in any suitable hardware, software, firmware, or combination thereof.

At block 1102, the virtualization driver is loaded. The virtualization driver may be an intermediate layer virtualization driver operating below the IP layer but above the MAC layer. For example, the virtual driver service 306 in FIG. 3 loads a virtualization driver 308, which abstracts the wireless network interface into multiple instances, two of which are represented as the virtual repeater interface 312 and virtual wireless interface 314. The virtualization driver 308 interacts closely with the wireless card device driver 310 to achieve the multiple instances and for switching between the different instances.

At block 1104, the parameters of the repeater function are provided. The loader module 422 in FIG. 4 inputs the parameters of the repeater function to the virtual repeater interface 312 to setup the repeater network. At block 1106, an address resolution protocol is broadcast to indicate the use of a station as repeater for a set of other stations. For example, an address resolution protocol (ARP) packet may be sent by the stations 104(1) to the access point 102 to indicate that packets to stations 104(2) and 104(3) should be routed through it. This would allow the packets for the stations 104(2) and 104(3) to be directed to the stations 104(1).

Figure 12:
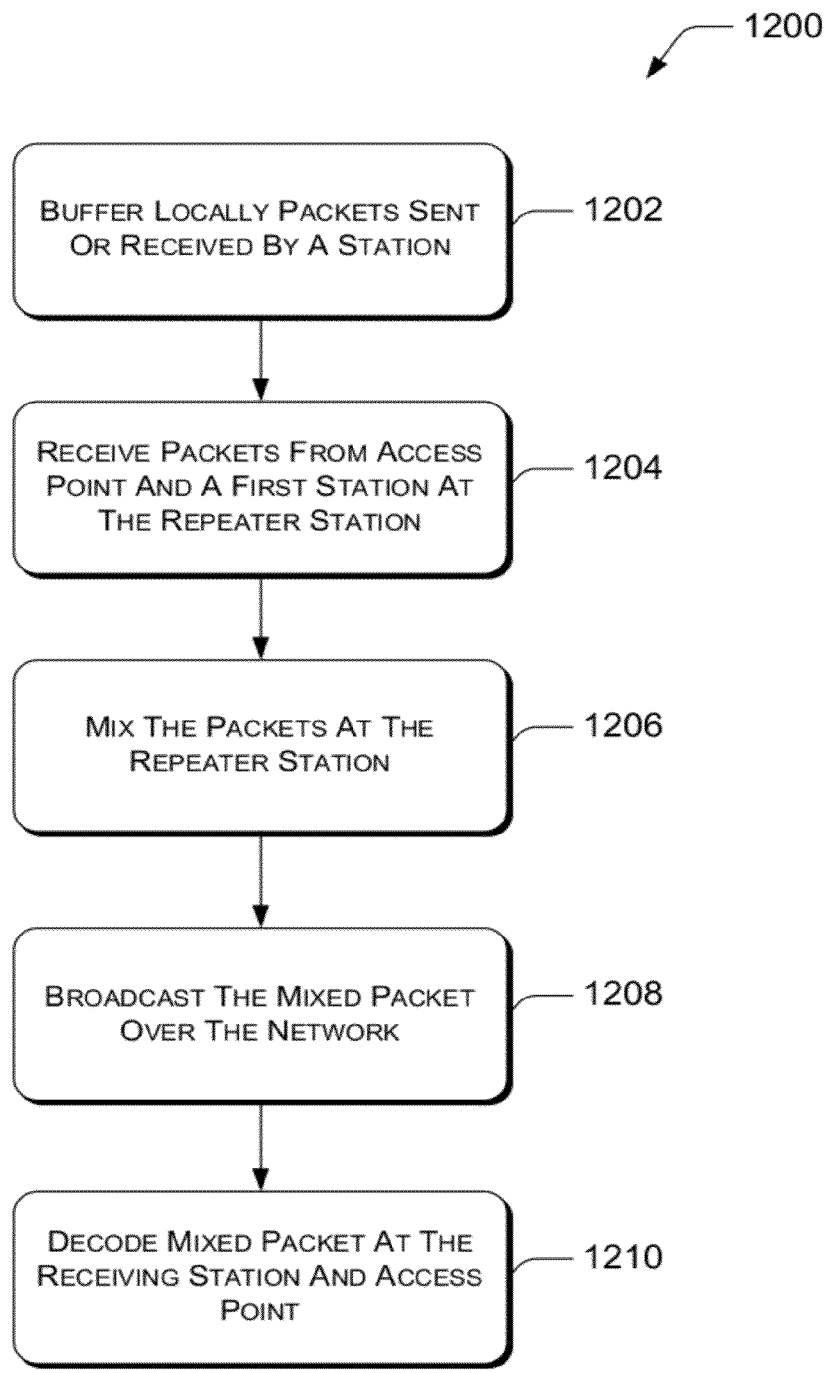
FIG. 12 is a flow diagram illustrating an exemplary process for employing a network coding protocol.

FIG. 12 illustrates an exemplary process 1200 to employ a network coding protocol as provided at block 912. The order in which the process is described is not intended to be construed as a limitation, and any number of the described method blocks can be combined in any order to implement the process, or an alternate process. Additionally, individual blocks may be deleted from the process without departing from the spirit and scope of the subject matter described herein. Furthermore, the process can be implemented in any suitable hardware, software, firmware, or combination thereof.

At block 1202, packets sent or received by a station are buffered locally at the station. For example, the packets sent or received by a station 104(2) would be buffered at the station 104(2). At block 1204, a station acting as a repeater receives packets from other stations utilizing the repeater function. For illustration, it may be assumed that the station 104(1) is acting as repeater for the station 104(2). In this case, the packets sent by the station 104(2) for the access point 102 would be received at the station 104(1) and vice versa.

At block 1206, the received packets are mixed. The station 104(1), receiving packets from the access point 102 and the station 104(2), mixes the packets. In one implementation, the mixing may be achieved by performing an Exclusive OR binary operation on the two packets. At block 1208, the mixed packets are broadcast over the wireless network. For example, the station 104(1) sends the mixed packet by broadcasting the mixed packet to all the stations. In one implementation, the station 104(1) unicasts the mixed packet to the destination station or access point, whichever is farthest from the broadcasting station (say for example the station 104(2)). By receiving a confirmation from the farthest station 104(2) it is assumed that all the other stations would have also received the mixed packet. Further, the mixed packet may be identified by checking the IP type version of the IP header of a packet received. For example, where the mixing is achieved by the operation of Exclusive OR on the two packets, the IP version value is 0 as opposed to the uncoded packet value of 4. Thus, a zero-overhead network coding protocol that does not require additional bytes to be added to the packet header to identify the contents of the coded packet may be utilized.

At block 1210, the mixed packets are decoded based on the buffered packets. The stations 104(2) and the access point 102 receive the mixed packet and remove from the mixed packet their respective sent packet (stored as buffered packet). The mixed packet may be received by other stations but the mixed packet may not be decoded by these stations as these do not have the buffered packets to decode the mixed packet. In one implementation, the operations performed at the blocks 1202-1210 are performed by the network coding module 412 in FIG. 4.

In addition to being a low-overhead protocol, the above implementation of network coding protocol eliminates the need for stations to periodically broadcast information about all the packets in the local buffer. The need for broadcasting this information existed for two reasons. Firstly, it helped stations to decide which packets to code. Secondly, it helped in the garbage collection of buffered packets. However, due to the traffic patterns created by the repeater function, the network coding protocol employed does not require such broadcasting.

For example, the repeater service module 120 at station 104(4) assumes that a station, say station 104(5), only buffers the packets that were sent by that station. So the station 104(4) maintains separate pointers for packets to different destinations and codes the packet destined to the access point 102 with the packet destined for the station 104(5). The maintenance of the pointers allows the station 104(4) from coding packets destined for another station. Thus, the station 104(4) does not need to receive information about the packets present in the local buffer of the other stations on the network. Secondly, buffered packets may be maintained as a ring buffer, and the garbage collects packets from these buffers during a send or receive operation. For example, when a station 104(5) decodes a coded packet sent by the station 104(4), all the packets used for coding are deleted from the buffer. Thus, the need of broadcasting the information about packets in the local buffers is not necessary. This elimination of constant broadcasting of information increases the capacity of the wireless network as the network as extra packets of information need not be handled by the network.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

We claim:

1. A device comprising:
   memory;
   one or more processors;
   one or more wireless network interfaces to facilitate access to a wireless network, wherein each wireless network interface supports a promiscuous mode; and
   a repeater service module, stored in the memory and executed on the one or more processors, the repeater service module for accessing the one or more wireless network interfaces to activate a repeater function at the device, wherein the repeater service module comprises:
      a network coding module to improve capacity of the wireless network, the network coding module comprising:
         a buffer module to locally buffer packets sent or received by one or more stations in the wireless network for a certain period of time to form buffered packets;
         a mixing module to mix, at the device activating the repeater function, a packet received from a first station for an access point and a packet received from the access point for the first station to form a mixed packet;
         a broadcast module to broadcast the mixed packet to the one or more stations in the wireless network; and
         a decode module to decode the mixed packets received based on the buffered packets.

2. A device as recited in claim 1, wherein the repeater service module further comprises:
   a rate anomaly detection module to detect a rate anomaly in the wireless network; and
   a node requestor module to request one or more stations to activate the repeater function at the one or more stations in the wireless network if activating a repeater network at the one or more stations would reduce the rate anomaly in the wireless network.

3. A device as recited in claim 1, wherein the repeater service module further comprises:
   a repeater utility module to determine whether activation of the repeater function would be beneficial to the device based on expected throughput improvement, burden on system resources and security concerns to the device and wireless network due to the activation.

4. A device as recited in claim 1, wherein the repeater service module further comprises:
   a repeater protocol module to communicate with one or more stations before activating the repeater function at the device for determining utility of the repeater function at the device to the one or more stations.

5. A device as recited in claim 4, wherein the repeater protocol module further comprises:
   an initiator module to broadcast a message with IP addresses of each of one or more stations in the wireless network, the message comprising estimated data rates of each of the one or more stations when utilizing the repeater function at the device;
   a receiver module to receive messages from the one or more stations wherein the received message comprises utility calculated by the one or more stations if the repeater function is utilized;

a selector module to broadcast a message with recalculated utility to a selected set of the one or more stations based on the received messages; and an authorize module to authorize activation of a repeater network based upon receipt of a sufficient set of responses in favor of participation from the selected set of the one or more stations.

6. A device as recited in claim 1, wherein the repeater service module further comprises:

an activator module to activate the repeater function, the activator module comprising:

a driver module to load a kernel-based intermediate-layer virtualization driver capable of abstracting the one or more wireless network interfaces into multiple virtual instances to create a primary virtual interface and a repeater virtual interface; and a loader module to plug the details of a repeater network into the repeater virtual interface to establish the repeater network at the device alongside the wireless network.

7. A device comprising:

memory;

one or more processors;

one or more wireless network interfaces to facilitate access to a wireless network, wherein each wireless network interface supports a promiscuous mode; and a repeater service module, stored in the memory and executed on the one or more processors, the repeater service module for accessing the one or more wireless network interfaces to activate a repeater function at the device, wherein the repeater service module comprises:

a repeater protocol module to communicate with one or more stations before activating the repeater function at the device for determining utility of the repeater function at the device to the one or more stations, wherein the repeater protocol module comprises:

an initiator module to broadcast a message with IP addresses of each of one or more stations in the wireless network, the message comprising estimated data rates of each of the one or more stations when utilizing the repeater function at the device;

a receiver module to receive messages from the one or more stations wherein the received message comprises utility calculated by the one or more stations if the repeater function is utilized;

a selector module to broadcast a message with recalculated utility to a selected set of the one or more stations based on the received messages; and an authorize module to authorize activation of the repeater network based upon receipt of a sufficient set of responses in favor of participation from the selected set of the one or more stations.

8. A device as recited in claim 7, wherein the repeater service module further comprises:

an activator module to activate the repeater function, the activator module comprising:

a driver module to load a kernel-based intermediate-layer virtualization driver capable of abstracting the one or more wireless network interfaces into multiple virtual instances to create a primary virtual interface and a repeater virtual interface; and a loader module to plug the details of a repeater network into the repeater virtual interface to establish the repeater network at the device alongside the wireless network.

9. A device as recited in claim 7, wherein the repeater service module further comprises:

a rate anomaly detection module to detect a rate anomaly in the wireless network; and a node requestor module to request one or more stations to activate the repeater function at the one or more stations in the wireless network if activating a repeater network at the one or more stations would reduce the rate anomaly in the wireless network.

10. A device as recited in claim 7, wherein the repeater service module further comprises:

a repeater utility module to determine whether activation of the repeater function would be beneficial to the device based on expected throughput improvement, burden on system resources and security concerns to the device and wireless network due to the activation.

11. A device as recited in claim 7, wherein the repeater service module further comprises:

a network coding module to improve capacity of the wireless network, the network coding module comprising:

a buffer module to locally buffer packets sent or received by one or more stations in the wireless network for a certain period of time to form buffered packets;

a mixing module to mix, at the device activating the repeater function, a packet received from a first station for an access point and a packet received from the access point for the first station to form a mixed packet;

a broadcast module to broadcast the mixed packet to the one or more stations in the wireless network; and a decode module to decode the mixed packets received based on the buffered packets.

12. A device comprising:

memory;

one or more processors;

one or more wireless network interfaces to facilitate access to a wireless network; and a repeater service module, stored in the memory and executed on the one or more processors, the repeater service module for accessing the one or more wireless network interfaces to activate a repeater function at the device, wherein the repeater service module comprises:

a network coding module to:

buffer packets of one or more stations in the wireless network to form buffered packets;

mix a packet of at least one of the one or more stations and a packet of an access point of the wireless network to form a mixed packet; and decode the mixed packet based in part on the buffered packets; a repeater protocol module to:

communicate with at least one of the one or more stations before activating the repeater function at the device; and authorize activation of a repeater network based upon receipt of a sufficient set of responses in favor of participation from a selected set of the one or more stations.

* * * * *